United States Patent [19]

Wales et al.

[11] Patent Number: 4,531,599
[45] Date of Patent: Jul. 30, 1985

[54] METHOD AND APPARATUS FOR WEIGHING WASTE SIGNATURES FROM A PRINTING PRESS

[76] Inventors: R. Langdon Wales, Moccasin Hill, Lincoln, Mass. 01773; H. W. Crowley, 310 Parker, Newton, Mass. 02159

[21] Appl. No.: 519,001

[22] Filed: Aug. 1, 1983

[51] Int. Cl.³ .............................................. G01G 13/14
[52] U.S. Cl. ........................................ 177/165; 177/63
[58] Field of Search ................... 177/165, 1, 17, 25, 177/63; 364/143, 144, 442, 446

[56] References Cited

U.S. PATENT DOCUMENTS

| | | | |
|---|---|---|---|
| 2,955,464 | 10/1960 | Elwell, Jr. | 364/442 X |
| 3,828,869 | 8/1974 | Sellers | 177/1 X |
| 4,330,837 | 5/1982 | Itani | 177/25 X |
| 4,425,974 | 1/1984 | Kipp | 177/25 X |
| 4,442,911 | 4/1984 | Fukuda | 177/165 |

FOREIGN PATENT DOCUMENTS 727164  3/1955  United Kingdom ................ 177/165

Primary Examiner—E. A. Goldberg
Assistant Examiner—Fred L. Kampe
Attorney, Agent, or Firm—Wolf, Greenfield & Sacks

[57] ABSTRACT

An automatic method and associated apparatus for weighing material and in particular for determining signature counts in association with a printing press. The system provides for the automatic registration of tare weight and for automatic removal detection and automatic registration of the last weight prior to removal. Also, in one embodiment described herein there is displayed a time signal representative of the time to go with regard to obtaining a desired full complement of good signatures.

17 Claims, 3 Drawing Figures

METHOD AND APPARATUS FOR WEIGHING WASTE SIGNATURES FROM A PRINTING PRESS

BACKGROUND OF THE INVENTION

The present invention relates in general to a method and apparatus for weighing material and particularly an automatic counting and management system used in conjunction with a printing press operation or other converting machinery operation. More particularly, the present invention relates to an automatic control and detection system that provides for signature counting and also provides vital press information instantly updated and that continuously guides the press man in his operation.

It is an object of the present invention to provide an automatic counting system for determining signature counts in association with a printing press operation.

Another object of the present invention is to provide an automatic counting system as in accordance with the preceding object and which provides for automatic detection of tare weight.

A further object of the present invention is to provide an automatic counting system in accordance with the preceding objects and which provides for automatic waste bin or waste cart removal detection.

Still a further object of the present invention is to provide an automatic counting system as in accordance with the preceding objects and which provides for an automatic alarm, prior to desired removal of a full waste bin or waste cart.

Still another object of the present invention is to provide an automatic counting system in accordance with the preceding objects and which registers the time remaining until the skid of wood sheets is considered full and ready for removal as a function of press speed.

SUMMARY OF THE INVENTION

To accomplish the foregoing and other objects of this invention in accordance with one feature thereof, there is provided for the automatic detection of tare weight by recording the first stable weight (stable, for example, for five seconds) once a predetermined minimum waste bin weight has been exceeded. In accordance with this feature there is provided an apparatus for weighing waste signatures in a waste bin taken from a printing press. This apparatus generally comprises a scale means for providing an electrical signal representative of cumulative weight of signatures along with the weight of the waste bin. Means are provided for sensing movement of the waste bin on to the scale means to provide a control signal. In accordance with one aspect of the present invention means are provided responsive to both the electrical signal representative of scale weight and also the control signal for providing in an automatic manner a signal representative of the bin tare weight. The means for providing the signal representative of bin tare weight preferably comprises sample and hold means having a sample input network for receiving the aforementioned control signal and having means for holding the electrical scale signal that is present at the time the control signal is generated.

In accordance with another aspect of the present invention there is provided the feature of automatically recording the last valid weight by freezing the current value whenever there is erratic scale movement. If the first stable (for, for example, five seconds) reading is below the predetermined minimum waste bin weight, then the last frozen value was the full bin weight value. In accordance with this feature of the invention, the apparatus may comprise means for sensing removal of the waste bin from the scale means in an automatic fashion. This means for sensing removal of the waste bin may comprise separate means, one for sensing the full weight condition and a means for comparing the full weight condition signal with the present electrical scale signal. The means for sensing full weight may comprise a sample and hold means and the means for comparing may comprise a comparator and a divider network for providing an under 100% of full weight signal to the reference input of the comparator.

Finally, in accordance with another aspect of the present invention means are provided for generating a signal to be displayed that is indicative of the time remaining until a full compliment of good signatures has been obtained off of the press. In connection with this feature of the invention the apparatus comprises means for detecting total signatures from the press, means for weighing waste signatures, and means for deriving total good signatures by subtracting from the total signatures the waste signatures. Means are provided for establishing a total desired count of good signatures and means are provided for deriving a signal representative of the number of signatures-to-go to reach this desired total count. The press speed is sensed such as by means of a rate meter and digital to analog converter. Finally, means are provided preferably in the form of a divider network responsive to press speed and the number of signatures remaining to go, to thus provide a signal representative of time to go to reach the desired number of total good signatures.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
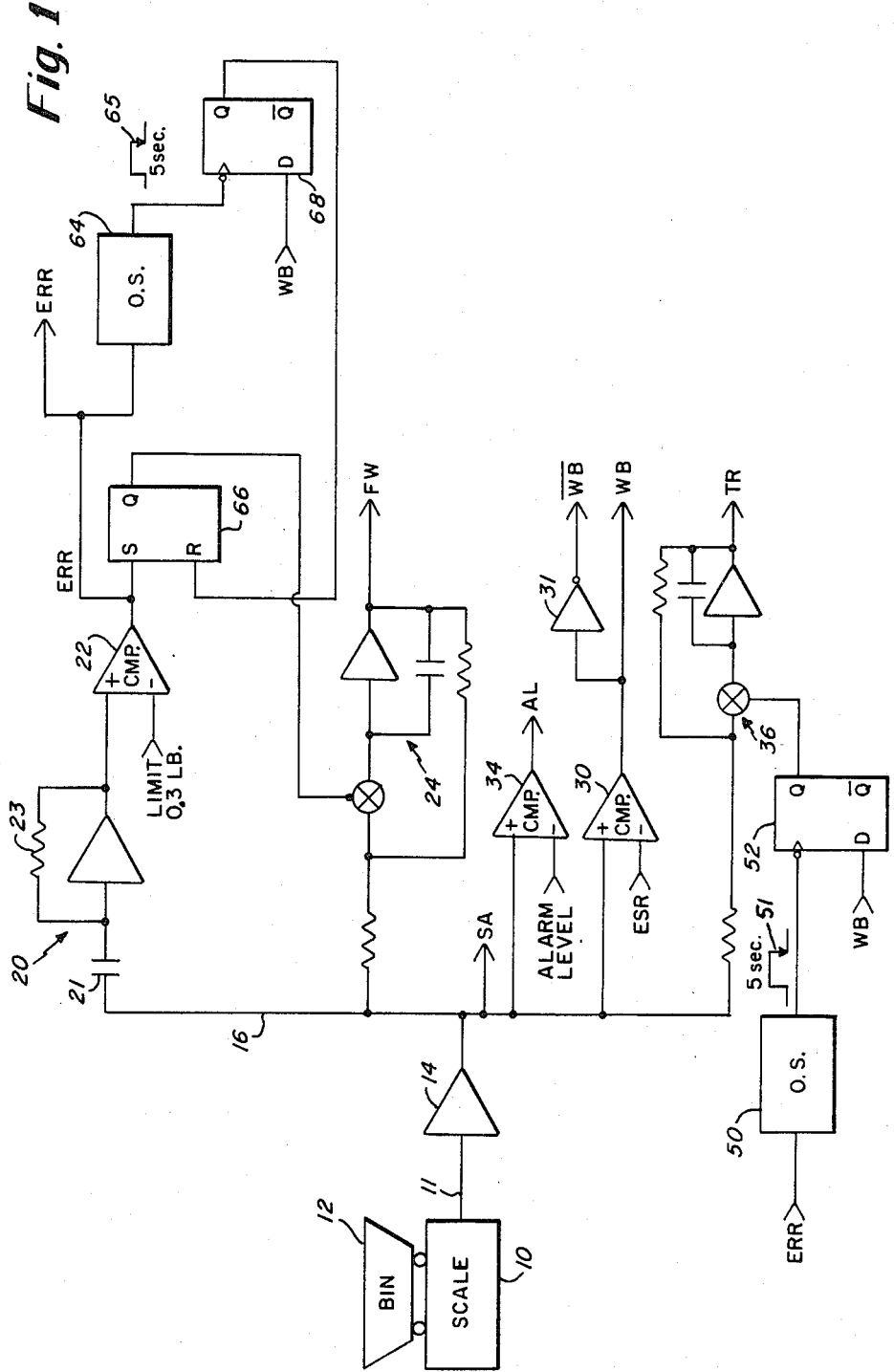
FIG. 1 is a schematic diagram of a portion of one embodiment of a system in accordance with the present invention.
Figure 2:
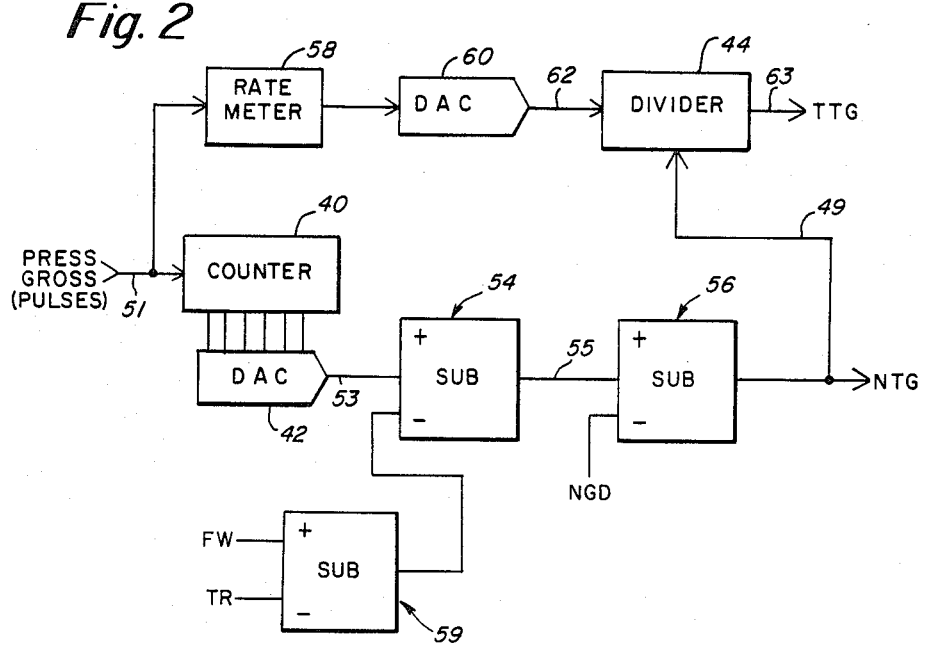
FIG. 2 is a schematic diagram showing the remainder of the system shown in FIG. 1.
Figure 3:
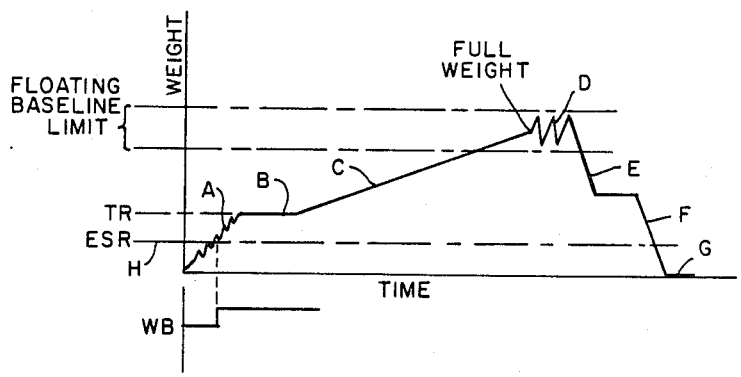
FIG. 3 is a time-weight graph useful in association with the diagrams of FIGS. 1 and 2.

FIG. 1 is a schematic diagram illustrating a portion of the system described herein. The remaining portion of the system is shown in FIG. 2. FIG. 3 is a graph of weight verses time that is helpful in explaining the control provided by the concepts of this invention as embodied in FIGS. 1 and 2.

The graph of FIG. 3 may be broken down into different segments. Segment A represents the time over which a storage bin or cart is placed upon the scale. This segment is shown as perhaps being somewhat erratic which occurs when a cart is rolled on to a scale. For at least a short segment B the weight is constant. This thus represents the tare weight as illustrated in FIG. 3. There is then a relatively long curve segment C which is representative of a period over which the waste paper is being deposited in the storage bin on the scale. The next segment is segment D which is shown as being cyclic representing erratic behavior that occurs as the storage cart is about to be removed from the scale.

This erratic behavior is one of the parameters that is being sensed with the circuitry of FIG. 1.

When the first set of wheels from the cart passes from the scale this is represented by the drop in the graph at segment E. There is also shown a segment F which represents the transition off of the scale when the last wheel of the cart is removed from the scale.

FIG. 1 shows a preferred embodiment of the present invention. In the embodiment of FIG. 1 there is shown the scale 10 with the storage bin 12 shown schematically above the scale 10. The scale 10 is of conventional design and is considered in FIG. 1 as having an analog output on line 11 that couples to an amplifier or driver 14 with the output thereof coupling to the common line 16 where the signal SA (scale analog) is generated. The bin 12 is for containing waste paper coming from a printing press or possibly from other like apparatus. The circuit of FIG. 1 is adapted to provide certain control signals particularly providing an automatic signal representative of tare weight. This is the signal TR shown in FIG. 1.

In FIG. 1, the description is in the form of analog circuitry. However, it is understood that it may be more advantageous to provide analogous digital control, preferably by means of computer hardware/software techniques.

In FIG. 1 the circuitry includes analog network 20 which has an output coupling to comparator 22. Another circuit that couples from the common line 16 is the sample and hold circuit 24. The output of this circuit provides the signal FW (full weight). Still another circuit that couples from the common line 16 is the comparator 30. This circuit provides the signal WB (waste bin on scale) and may also provide the negation of that signal. There is also shown a sample and hold circuit 36 and associated logic described in detail hereinafter. The sample and hold circuit 36 is for generation of the tare weight signal TR.

Associated with the sample and hold circuit 36 there is detection circuitry including a monostable multivibrator or one-shot 50 and flip-flop 52. The one-shot 50 receives the signal ERR (erratic). This is the signal taken from the output of the comparator 22.

Circuitry is also provided associated with the comparator 22 and the sample and hold network 24. This circuitry includes a multivibrator or one-shot 64 and flip-flops 66 and 68.

In FIG. 1 the comparator 22 is coupled to the common line 16 by way of the analog network 20. This network provides filtering by means of capacitor 21 and resistor 23 which essentially function as a differentiator to detect any appreciable change in weight sensed at the line 16. The signal LIMIT at the reference input to the comparator 22 is set at a level corresponding to 0.30 pounds so that if there is a change of weight of at least 0.30 pounds, then the comparator 22 is activated indicating an erratic condition. This may occur when the cart is placed on the scale (segment A, FIG. 3) or is removed (segment D, FIG. 3) from the scale, or when an operator stands upon the scale to retrieve the waste bin. However, the operator's weight is not included since it is normally difficult for the operator to keep his movement to less than 0.3 pounds. Thus, the signal FW is held to be the value just before the operator stepped on the scale and the signal FW resumes when the operator gets off the scale.

The signal ERR sets the flip-flop 66 and this signal also couples to the one-shot 64. Both the one-shot 64 and the one-shot 50 are retriggerable one-shots and the output shown in FIG. 1 from each of these has a five second duration. The purpose of the one-shots is to have a five second stable period. At the end of this period, at the falling edge 65 of the waveform, the flip-flop 68 is triggered by this negative going edge. The data input to the flip-flop 68 is the signal WB. The output of the flip-flop 68 couples to the reset input of the flip-flop 66. The assertion output of the flip-flop 66 in turn couples to the control input of the track and hold circuit 24.

The signal ERR taken from the output of the comparator 22, as indicated previously, is generated whenever a change in weight is detected at the scale greater than the limit reference at the reference input to the comparator 22. In one embodiment, this LIMIT reference is set at a voltage corresponding to 0.30 pounds of paper. Thus, each time that there is an output from the comparator 22, this signal sets the flip-flop 66. When the flip-flop 66 is set its output Q goes high causing the circuit 24 to hold and cease continuous sampling. Prior to the setting of flip-flop 66 the output Q is low controlling circuit 24 to sample or track.

The signal ERR also couples to the one-shot 64 which is a retriggerable one-shot. Thus, as long as the signal ERR is generated, the one-shot 64 is retriggered. However, at some point in time, after a predetermined time interval such as 5 seconds, after the one-shot 64 has timed out without being retriggered, there is a falling edge 65 that triggers the flip-flop 68. The flip-flop 68 senses the state of the signal WB. It is noted that it is the affirmative of this signal that couples to the data input of the flip-flop 68.

Thus, at the end of the one-shot time period, indicating a sufficient period of time over which erratic operation did not occur, then the flip-flop 68 determines whether the waste bin is on the scale or not. If the waste bin is on the scale as represented by the signal WB, then the flip-flop 68 is set by the falling edge 65 and this signal couples back to the flip-flop 66 to reset the flip-flop 66.

The bin removal or erratic signals may be used as an indication to carry out other tasks in the weighing system such as use in conjunction with conveyor control.

With reference to FIGS. 1 and 3, it can be assumed that operation commences by rolling the storage bin onto the scale 10. This is shown in FIG. 3 by the segment A. Note that during the segment A, the signal WB transitions high. Now, it is noted that the segment B in FIG. 3 is representative of a level that corresponds to the tare weight. The tare weight is detected by the sample and hold or tracking circuit 36 in combination with the one shot 50 and the flip-flop 52. Again, when the bin moves on to the scale, the signal ERR is generated and this is coupled to the one shot 50. After the signal ERR is absent for at least 5 seconds as determined by the one shot 50, then the output of the one shot 50 has a negative transition 51 that couples to the clock input of the flip-flop 52. If the signal WB is low, the output of the flip-flop at its output Q is low and this enables tracking of the circuit 36. However, the erratic signal that occurs during segment A, once it has settled down for 5 seconds, the signal WB is high because the waste bin is then on the scale. Thus, when that setting of the flip-flop occurs, the Q output goes high and this holds the circuit 36 essentially holding the analog signal SA which becomes the tare weight signal representative of the weight of the cart alone prior to any filling of the cart as occurs along segment C in FIG. 3. Thus, the tare weight has been measured automatically and there is no need to keep track of tare weight for each different cart that may be employed. In the past separate tare weights were calculated for each cart and these tare weights were then separately used in making calculations. However, with the arrangement as illustrated in FIG. 1, now tare weight is detected automatically and there is no need to keep track of tare weight for each cart that might be employed.

The operation continues through segment C with the waste bin being filled. Refer to the signal LIMIT and the comparator 22. When the signal to the comparator 22 exceeds the LIMIT the signal ERR (erratic) is generated.

When the flip-flop 66 was previously reset, this caused tracking by the analog circuit 24. When the flip-flop 66 is set, this holds the final value of the analog signal on line 16, indicated in FIG. 1 as the signal FW to indicate a cumulative weight condition.

Now, should an erratic signal be generated, say during segment C if the operator should, for example, step onto the scale, this signal will cause a setting of the previously reset flip-flop 66. When this occurs, the output Q from the flip-flop 66 goes high and holds the analog signal at circuit 24. This has the effect of freezing the weight signal with tracking resuming only when the flip-flop 66 is reset. The erratic signal will continue and even though the one-shot 64 provides for a timing out, as indicated previously, it is very difficult for the operator to stand on the scale without causing some weight variation which will maintain the erratic signal. The erratic signal should only cease after the operator gets off of the scale. Then, the one-shot 64 times out and the trailing edge 65 clocks the flip-flop 68. Because the waste bin is still on the scale, the output of the flip-flop 68 is high causing a resetting of the flip-flop 66. This has the effect of resuming the tracking because the output Q from the flip-flop 66 now goes low which is indicative of its tracking mode. Furthermore, the tracking is resumed without having taken into effect that weight was added when the operator got onto the scale. As far as a system is concerned, the operator's weight is ignored.

FIG. 1 also shows the comparator 30 which receives the signal ESR shown as a threshold level H in FIG. 3. The signal ESR refers to an empty scale reference. When the analog signal from line 16 exceeds this reference, then the signal WB is generated, indicating that the waste bin is on the scale. It is noted that there is also provided in FIG. 1 an inverter 31 for providing the negation of the signal WB, i.e. WB−.

There is also provided alarm means for signaling when the weight reaches a point close to where bin removal would be advisable. In this regard refer to the alarm comparator 34 and the output signal AL. This is a signal that would be generated when the weight reaches a point close to the end of the segment C in FIG. 3.

In FIG. 3 there is shown the segment D which is illustrative of a point wherein the bin is removed from the scale again causing the erratic signal to be generated, namely, the signal ERR. This erratic signal also has the effect of setting the flip-flop 66 to provide a holding of the signal which in this case will be the true and final full weight signal. After the erratic signal ends and stability occurs for at least the aforementioned 5 seconds, then the signal at the output of the one-shot 64 transitions at the falling edge 65 to clock the flip-flop 68.

However, the signal WB is then low and thus the output from the flip-flop 68 does not reset the flip-flop 66. This thus means that the full weight signal is temporarily held. The common occurrence of the clocking of the flip-flop 68 along with the WB signal being low is an indication that one is at a full weight condition and thus the signal at the output of the circuit 24 can then be detected to determine what this full weight condition is.

In addition to the aforementioned alarm signal AL provided in FIG. 1 to indicate that the weight is approaching the maximum capacity of the storage bin and scale, it is also advantageous to provide a signal to be displayed indicative of the time remaining before the printing run is complete. In this regard refer to FIG. 2 which shows a counter 40, digital to analog converter 42, analog networks 54 and 56, rate meter 58, digital to analog converter 60, and divider network 44. The counter 40 is shown as having a clock input at line 51. This is a pulse input from the printing press indicating the gross output from the press. The output of the counter 40 couples to the digital to analog converter 42 and thus the output of the converter 42 is an analog signal at line 53 representative of the present gross output of signatures from the press. This analog signal couples to the analog network 54 which is a difference or subtraction network. It is noted that this network also receives the signal from the current 59. The signal on line 53 is one representative of a gross (total) count of signatures from the press while the signal FW is representative of the full weight of waste. There is also provided in FIG. 2 a subtraction circuit 59 which provides for subtraction of the tare weight. Thus, the waste count is actually represented by the full weight minus the tare weight and thus those two inputs to the subtraction network 59 provide for a waste count. The gross count minus the waste count is representative of good signatures. The network 54 being a difference network thus provides at its output 55 an analog signal representative of the gross signatures minus waste signatures which provides an indication of the good signatures that have occurred from the press. This signal couples to the second analog network 56 which also receives a signal on line 57 referred to as the signal NGD (net good desired). This is a reference signal that may be set in a predetermined manner and is a signal of a magnitude representative of the net good signatures that are desired. The network 56 is also a difference or subtraction network and thus the output at line 49 is the signal NTG (needed-to-go) which is a signal indicative of the number of good signatures that are still required before the total number of good signatures is reached.

The pulse input signal on line 51 couples to a rate meter 58 which may be of conventional design providing a digital output that couples to the digital to analog converter 60. This arrangement provides for an analog signal at the output line 62 from the converter which is a signal representative of press speed. The signal on line 62 couples to the divider network 44. Also the divider network 44 receives the signal on line 49 mentioned previously. The output of the divider network is the signal TTG (time-to-go).

The time-to-go until the job is finished is represented by the ratio of the number of signatures that are still needed divided by the press speed. This division is carried out by the divider 64 which receives the signal representative of the press speed on line 62 and the second signal on line 59 which is representative of the number of signatures that are required to go. Thus, as indicated on the output line 63 from the divider 44 there is the signal TTG which is representative of the time-to-go until the desired number of total good signatures is obtained.

Having now described one embodiment of the present invention, it should now be apparent to those skilled in the art that numerous other embodiments are contemplated as falling within the scope of this invention.

What is claimed is:

1. Apparatus for weighing waste signatures in a waste bin and taken from a printing press or the like comprising:
   scale means for providing an electrical signal representative of cumulative weight of waste signatures in the waste bin,
   means for sensing movement of said waste bin onto the scale means to provide a control signal, and
   means responsive to both said scale means signal and the control signal for automatically providing a signal of bin tare weight,
   said means for sensing including differentiator means for detecting any appreciable change in sensed weight occasioned by movement of the waste bin onto the scale means,
   said control signal including a first signal that is indicative of erratic weight behavior as occurs when the waste bin is moved onto the scale means followed by a second signal generated by said means for automatically providing for holding the electrical scale signal that is present at the time the second signal is generated.

2. Apparatus for weighing waste signatures as described in claim 1 wherein said means for providing a signal of bin tare weight comprises a sample and hold means having a sample input coupled from said scale means and a control input, and delay means for providing said second signal that couples to the control input of the sample and hold means.

3. Apparatus for weighing waste signatures as described in claim 1 wherein said means for providing a signal of bin tare weight comprises sample and hold means having a sample input network.

4. Apparatus for weighing waste signatures as described in claim 3 wherein said sample input network comprises a bistable means for receiving a control signal indicative of the waste bin being on the scale and gate means.

5. Apparatus for weighing waste signatures as described in claim 4 wherein said means for sensing movement comprises means for comparing the electrical scale signal and a reference signal representative of an empty scale.

6. Apparatus for weighing waste signatures as described in claim 1 including comparator means having one input coupled from the scale means to monitor the electrical signal therefrom and a second input for receiving an alarm reference signal.

7. Apparatus for weighing waste signatures as described in claim 1 including sample and hold means for registering a full weight condition.

8. Apparatus for weighing waste signatures in a waste bin and taken from a printing press or the like comprising;
   scale means for providing an electrical signal representative of cumulative weight of waste signatures and the waste bin,
   means for sensing movement of the waste bin onto the scale means including differentiator means for detecting any appreciable change in sensed weight occasioned by movement of the waste bin onto or off of the scale means to thereby establish a first control signal that is indicative of erratic weight behavior as occurs when the waste bin is moved onto or off of the scale means,
   means for sensing removal of the waste bin from the scale means,
   means for establishing a second control signal upon termination of the first control signal indicative of cessation of the erratic weight behavior, and
   means responsive to both said second control signal and the removal of the waste bin for providing a full weight signal.

9. Apparatus for weighing waste signatures in a waste bin as described in claim 8 wherein said means for establishing a second control signal including delay means for establishing a delay period following the erratic weight period.

10. Apparatus for weighing waste signatures in a waste bin as described in claim 9 wherein said means for providing a full weight comprises sample and hold means.

11. Apparatus for weighing waste signatures in a waste bin as described in claim 10 wherein said sample and hold means as a sample input coupled from said scale means and a control input controlled from said second signal.

12. Apparatus for weighing waste signatures in a waste bin taken from a printing press or the like comprising;
   means for detecting total signatures from the press,
   means for weighing waste signatures,
   means for deriving total good signatures by subtracting from said total signatures the waste signatures,
   means for establishing a total desired count of good signatures,
   means for deriving a signal representative of the number of signatures to go to reach the desired total count,
   means for sensing press speed, and
   means responsive to press speed and number of signatures to go to provide a signal representative of time to go to reach the desired number of total good signatures.

13. Apparatus for weighing waste signatures in a waste bin as described in claim 12 wherein said means for detecting total signatures includes counter means and converter means.

14. Apparatus for weighing waste signatures in a waste bin as described in claim 13 wherein said means for deriving total good signatures comprises difference circuit means.

15. Apparatus for weighing waste signatures in a waste bin as described in claim 14 wherein said means deriving signatures to go comprises second difference circuit means.

16. Apparatus for weighing waste signatures in a waste bin as described in claim 15 wherein said means to provide a signal of time to go comprises divider means.

17. Apparatus for weighing waste signatures in a waste bin as described in claim 12 wherein said means to provide a signal of time to go comprises divider means.

* * * * *